(12) United States Patent
Starovic et al.

(10) Patent No.: US 6,625,751 B1
(45) Date of Patent: Sep. 23, 2003

(54) SOFTWARE FAULT TOLERANT COMPUTER SYSTEM

(75) Inventors: Gradimir Starovic, Pinner (GB); Martin P Mayhead, Hindhead (GB)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/525,280

(22) Filed: Mar. 14, 2000

(30) Foreign Application Priority Data

Aug. 11, 1999 (GB) .............................................. 9918987

(51) Int. Cl.[7] .............................................. G06F 11/16
(52) U.S. Cl. ........................................... 714/11; 714/13
(58) Field of Search ............................. 714/11, 10, 12, 714/13

(56) References Cited

U.S. PATENT DOCUMENTS

| | | | | |
|---|---|---|---|---|
| 5,488,716 A | * | 1/1996 | Schneider et al. ............. | 714/10 |
| 5,737,513 A | * | 4/1998 | Matsuda et al. .............. | 714/11 |
| 5,805,790 A | | 9/1998 | Nota et al. | |
| 6,035,415 A | * | 3/2000 | Fleming ....................... | 714/11 |
| 6,145,089 A | * | 11/2000 | Le et al. ........................ | 714/4 |

OTHER PUBLICATIONS

Bressoud, "TFT: A Software System for Application—Transparent Fault Tolerance," 1998, pp. 128–137.
Slye et al., "Supporting Nondeterministic Execution in Fault–Tolerant Systems," © 1996 IEEE, pp. 250–259.
Slye et al., "Support for Software Interrupts in Log–Based Rollback–Recovery," IEEE Transactions on Computers, vol. 47, No. 10, Oct. 1998, pp. 1113–1123.
Murray et al., "Somersault: Software Fault–Tolerance," © Hewlett–Packard Company 1998, pp. 1–20.
Murray et al., "Somersault: Enabling Fault–Tolerant Distributed Software Systems," © Hewlett–Packard Company 1998, pp. 1–18.
Huang et al., "Software Fault Tolerance in the Application Layer," *Software Fault Tolerance in the Application Layer*, © 1995 John Wiley & Sons, Ltd., pp. 231–248.
Kim, "The Distributed Recovery Block Scheme," *Software Fault Tolerance*, © John Wiley & Sons, Ltd., pp. 189–209.
Cristian, "Exception Handling and Tolerance of Software Faults," *Software Fault Tolerance*, © John Wiley & Sons, Ltd., pp. 81–107.

\* cited by examiner

*Primary Examiner*—Scott Baderman
(74) *Attorney, Agent, or Firm*—Meyertons Hood Kivlin Kowert & Goetzel, P.C.; B. Noël Kivlin

(57) ABSTRACT

A software fault tolerant computer system includes a primary virtual machine and a secondary virtual machine. The secondary virtual machine is operable to replicate the primary virtual machine by replicating operations performed on the primary virtual machine. The primary and the secondary virtual machines are further operable to test for equivalent operation of the primary and secondary virtual machines at predetermined stages of operation. This provides software fault tolerance wherein both a unit of replication and a component that implements the fault tolerance mechanisms is a virtual machine (VM). Since a VM as used by the invention has full knowledge of the semantics of application-level code, fault tolerance mechanisms can be provided by the VMs without requiring any increase in application complexity. Co-ordination of replicated states and computations is achieved with characteristics of both active and passive replication.

38 Claims, 9 Drawing Sheets

SOFTWARE FAULT TOLERANT COMPUTER SYSTEM

BACKGROUND OF THE INVENTION

This invention relates to fault tolerant computing, and in particular to software fault tolerant computing.

Many different approaches to fault-tolerant computing are known in the art. Fault tolerant computing is typically based on providing replication of components and ensuring for equivalent operation between the components. A brief outline of the advantages and disadvantages of some of the known choices is given below.

A fault-tolerant mechanisms can be implemented by replicating hardware, for example by providing multiple processors with the same software operating on each of the processors. The replicated software is arranged to operate in lockstep during normal operation and a mechanism is provided to detect a failure of lockstep. The advantages of such an approach are fast detection and masking of failures, with fault-tolerance which is transparent to software. There are also some disadvantages of such systems. For example, they are difficult to develop and upgrade. Also, they inherently have "wasted" hardware resources. Moreover, the system does not tolerate software failures. Also, as very restricted knowledge about the software is available to the fault tolerant mechanisms, this may cause some inefficiency, for example it is difficult to know precisely which parts of memory have to be saved and/or restored with the result that conservative decisions are made about the necessary actions to be performed.

Similar advantages and disadvantages exist where fault tolerant mechanisms are implemented within a hypervisor (a software layer between hardware and OS), or even within an OS. Although more knowledge about software applications may be available in these cases, it is still very restricted, and a fault at the application level can still cause correlated failures of all the replicated units, which cannot be detected/masked by the fault tolerant mechanisms.

When the chosen fault tolerant mechanisms are placed in user-space, but below the applications (for example, in libraries, daemons, etc.) they are easier to implement and have increased coverage of software failures. There are disadvantages inherent in such approaches as well. For example, potential inefficiencies are related to failure detection and masking. There are higher overheads in normal operation. Also, only partial transparency for the applications is normally provided. The level of transparency varies between different approaches. For example, they often force the users to use a particular programming paradigm, which may not be the most appropriate for some applications.

Fault tolerant mechanism can also be implemented in applications. This gives the fault tolerant mechanisms full knowledge of the applications, but with the loss of any transparency. Moreover, such mechanisms are not reusable, and it is hard to make them efficient and reliable each time (for every specific application).

An example of a re-usable, user-level approach to software fault-tolerance is described in an article entitled "TFT: A software system for Application Transparent Fault Tolerance" by T. C. Bressoud from "The 28th Annual International Symposium on Fault-Tolerant Computing, JunE 1998". The article describes an arrangement of a software layer (Transparent Fault Tolerance layer, or TFT layer) between an operating system and applications that implements a fault tolerant mechanism. This is based on an earlier work by the same author entitled "Building a Virtually Fault Tolerant System", PhD Cornell University, May 1996, where the same approach for fault-tolerance was applied at the hypervisor level.

A TFT layer provides an interface that appears to an application to be identical to that of the underlying OS. The TFT layer implements primary-backup replication, resolves the input value non-determinism, asynchronous actions, and suppression of duplicate outputs. Failure detection is based on message acknowledgements and time-outs. TFT does not attempt to integrate failure detection and masking with the corresponding language-level constructs. The TFT layer intercepts system calls made by the applications and asynchronous exceptions raised by the OS, and after some processing, it decides whether to forward them to the OS or the application respectively. The non-deterministic system calls are performed only by a primary replica, which sends the results to the secondary replica. This solves the problem of non-deterministic input values.

In order to solve the problem of asynchronous actions raised by the operating system, TFT uses the concept of epochs. An epoch is a fixed-length sequence of actions excluding asynchronous actions. Computations by both primary replica and the backup replica are divided into the same sequence of epochs. The TFT layer is responsible for dividing computations into epochs and for co-ordinating the epochs of the primary replica and the backup replica. This is done using object code editing, whereby application binaries are modified adding the code for incrementing an epoch counter and for passing control to the TFT layer at epoch boundaries.

A similar technique for managing intervals of control flow is proposed in an article by J. H. Sly and E. N. Elnozahy, entitled "Supporting Non-deterministic Execution in Fault-tolerant Systems", from a Report CMU-CS-96-120, School of Computer Science Carnegie Mellon University, May 1996, and an article by J. H Sly and E. N. Elnozahy entitled "Support for Software Interrupts in Log-Based Rollback-Recovery", from IEEE Transactions on Computers, Vol. 47, No. 10, October 1998.

Intercepted asynchronous actions are buffered locally by the primary replica, and are forwarded to the secondary replica. They are delivered in the same order at both primary and secondary and at the same points in the control flow, which is at the epoch boundary.

The backup replica can detect that the primary replica has failed when either it does not receive the result of a non-deterministic system call, or it does not receive an end of epoch message. In either case, the backup becomes the new primary and starts performing the non-deterministic system calls and delivering asynchronous actions—at the epoch boundaries. At the promotion point there is some uncertainty about how far the old primary replica will have got in its computation before the failure happened. It might have performed some output actions, or received some asynchronous exceptions, and not have had time to communicate this to the backup. This can cause problems, as the failure now becomes non-transparent to the environment. In order to alleviate this problem the primary replica performs a "stability query" immediately before performing any output action. This is a blocking operation that allows the primary to continue only when it is known that the backup has received all the previously sent messages. This however does not completely solve the problem—there is still some uncertainty about the last output action, and about possible asynchronous actions received by the old primary before it failed (note that such an action was possibly an acknowledgement of a previous output action). Depending on the semantics of the specific uncertain action, there may be a solution in some cases (specifically for idempotent actions and those actions that allow TFT to ask the environment about their status). In other cases the only solution is to return an error code to the application which should indicate that there is uncertainty about the action's execution status.

Another interesting approach for software fault tolerance can be found at: www.omg.org/techprocess/meetings/schedule/Fault_Tolerance_RFP.html. This Internet site describes work in progress on a proposal for fault tolerant Corba (ftCorba) that allows for several kinds of replication (passive warm, passive cold, and active) for objects. Replicas are kept consistent and their state is updated despite asynchrony and failures. Object invocations and responses are contained in multicast messages that are totally ordered in a model of virtual synchrony. Also contained in these messages are state updates, failure notifications, and object group join and leave events. Applications can receive fault reports from the Failure Notification Service, but integration with the language-level support for failure detection and recovery (i.e., with exceptions) is limited, since exceptions are in general not channelled through a Failure Notification Service.

In passive replication, when the primary replica fails a new primary replica is elected and the most recent saved state of the old primary is applied to it (in warm replication this might have been done already). There is no support for virtualising and unvirtualising the input/output values. Also in passive replication, the passive replicas are dormant, if warm replication is used their state is updated, but otherwise they do not perform any actions.

In a related proposal by Eternal Systems Inc. and Sun Microsystems Inc. entitled "Proposal to OMG on Fault Tolerance", September 1998, a strong assumption is made that all application interactions with the application's environment are done as object invocations/responses, and that they all go through the multicast engine. All the objects (their methods) are assumed to be deterministic. This model is generally not appropriate for interactions between an application and the operating system or various non-object-oriented libraries. Similarly, although the proposal does provide suppression of duplicate invocations and responses, this is not enough if there are interactions with non-Corba services. It can be seen that, despite their considerable complexity, the ftCorba proposals, in general, do not cope with input non-determinism, suppression of duplicate outputs, and asynchronous external actions.

The two reports entitled "Somersault Software Fault Tolerance", Report HPL-98-06, HP Laboratories Bristol, January 1998 and "Somersault: Enabling Fault Tolerant Distributed Software Systems", Report HPL-98-81, HP Laboratories Bristol, by P Murray et al, describe Somersault, a library for providing increased availability to those applications that are required to be fault-tolerant. The implementation is based on a variant of primary-backup replication (the so-called primary-receiver secondary-sender approach) and is relying on a reliable communication mechanism between the replicas.

In Somersault, the primary replica does the non-deterministic events and forces the secondary replica to do them in the same way (with the same value, in the same order). This is achieved by passing messages from primary replica to the secondary replica through a log. Two kinds of events are distinguished: those initiated from outside (e.g., message received, timer expired, thread scheduled), and those initiated by the process (e.g., system calls). For the former, Somersault controls the order of delivery of these events to applications. For the latter, Somersault captures the result and injects it into the secondary replica. This is done with the application's help, that is non-transparently. The only output actions allowed are message sends, and they have to go via Somersault.

If the primary replica fails, this will result in the loss of input links (from clients to primary replica) and some possible loss of messages that were in transit somewhere on the path: client-primary-secondary. The recovery procedure is then that the secondary replica has to reconnect and the remote side has to re-send (either of these may be non-transparent to clients). If the secondary replica fails, this will result in the loss of output links (from the secondary replica to client) and some possible loss of output messages. The recovery procedure is then that the primary replica has to reconnect and send messages from a re-send queue. Re-integration of a new secondary replica is done by state transfer and transfer of output links from the primary replica to the secondary replica. Applications provide save_state operations that are invoked by Somersault. There is no support for virtualisation of values.

Y. Huang and C. Kintala, in a work entitled "Software Fault Tolerance in the Application Layer", chapter 10 in a book edited by M. R. Lyu entitled "Software Fault Tolerance", Trends in Software series (3), John Wiley & Sons, 1995, describes support for software fault tolerance using primary-backup replication where a backup is passive until there is a take-over. There is support for checkpointing process state, logging of process messages, and replicated disk files. The framework performs failure detection using heartbeat messages. Recovery after a process failure consists of restoring the process state using the-last checkpointed state, and replaying the logged messages that are applicable to this state.

K. H. Kim, in a work entitled "The Distributed Recovery Block Scheme", chapter 8 in the book edited by M. R. Lyu entitled "Software Fault Tolerance", Trends in Software series (3), John Wiley & Sons, 1995, describes distributed recovery blocks (DRB) integrated with the technique known as "pair of self-checking processing nodes" (PSP). This work has some similarities with TFT, but assumes that all input arrives in the same order and with the same values, over a multicast network, to both primary and backup. In DRB, a computation is done by repeating a cycle of: input/compute—and—test/output (multiple inputs/outputs are allowed in a single input/output phase respectively). The backup replica does not know what exactly a failed primary had done before failing. The primary replica has as its primary choice the first branch of the recovery block, while the backup replica has as its primary choice the second branch of the recovery block. It has been shown by F. Cristian in a work entitled "Exception Handling and Tolerance of Software Faults", chapter 4 in the book edited by M. R. Lyu entitled "Software Fault Tolerance", Trends in Software series (3), John Wiley & Sons, 1995, that appropriately strengthened exception model can express the recovery block structure. Also, unlike recovery blocks, exceptions are supported by some of the main stream programming languages.

U.S. Pat. No. 5,805,790 (Nota et. al.) describes a fault recovery method for a multi-processor system including a number of real processors, a single host operating system and shared memory. Multiple virtual machines (VMs) execute on the real processors with the assignment of VMs to real processors being under the control of the host operating system. Optionally the real processors are partitioned into logical partitions by the host OS and are treated as independent computing units. The system aims to recover a VM from a failure of a processor, of a partition, or of a VM itself. However, to achieve this it requires the shared storage and a shared operating system and further requires hardware support for fault-detection and recovery, including fault recovery circuits. The method includes the setting of recovery attributes for failure of each of the VM machines. The method also includes the storage in a real machine save area of main storage by one of the fault recovery circuits of data and status information on the occurrence of a fault, and the subsequent retrieval the data and status information to recover from the fault.

An aim of the present invention is to provide an approach to fault tolerant computing that mitigates at least some of the disadvantages of the prior art.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

In accordance with one aspect of the invention, there is provided a fault tolerant computer system comprising a primary virtual machine (VM) and a secondary virtual machine (VM). The secondary virtual machine is operable to replicate operations of the primary virtual machine and the primary and the secondary virtual machines are further operable, or co-operate, mutually to provide fault tolerance.

An embodiment of the invention thus provides a new approach to providing software fault tolerance wherein both a unit of replication and a component that implements the fault tolerance mechanisms is a virtual machine (VM). An embodiment of the invention for providing transparent software fault tolerance can be described as "a replicated virtual machine" and will be referred to hereinafter as an "rVM". By replicating operations performed on the primary VM, the secondary VM can provide a replica of the primary VM. The primary and the secondary VMs co-operate to provide a mechanism for providing mutual fault tolerance (i.e. for providing fault tolerance between each other). For example, they can each be operable to test for equivalent operation of each other at predetermined stages of operation. With an embodiment of the invention, it is not necessary to provide a separate level of control, for example a common operating system with shared storage, to ensure fault tolerance as this is achieved by the replicated VMs themselves. Since a VM as used by the invention has full knowledge of the semantics of application-level code, fault tolerance mechanisms can be provided by the VMs without requiring any increase in application complexity.

An embodiment of the invention can enable co-ordination of replicated states and computations with some characteristics of both active and passive replication. Similar to active replication, the VM replicas can perform the same computation in parallel. However, the backup operations in the secondary VM replica can be delayed with respect to primary's computation.

The present invention makes use of the high degree of integration with and knowledge about application code in a VM such as, for example, a Java VM. Further information about Java VM may be found, for example, in a book authored by T. Lindholm and F Yellin and entitled "The Java Virtual Machine Specification", Addison Wesley, The Java Series 1999, the whole content of which is incorporated herein by reference. Such a VM forms a general interpretation and execution engine for application code. This execution engine has its instruction set and its own memory. It logically lies directly under the application code itself (i.e., there is no operating system (OS), or some other software layer between the application code and VM which executes this code). An embodiment of the invention takes advantage of the fact that a virtual machine has full knowledge of the semantics of application level code that is being executed. This allows a tight integration between the fault tolerance mechanisms and the application code. It also allows appropriate processing of the application-level instructions that are related to input (reading from the environment), output (writing to the environment) and control and management of external (synchronous and asynchronous) actions.

The primary virtual machine can be operated on a first processing engine and the secondary virtual machine can be operated on a second processing engine. An exchange of data is provided between the processing engines via a link. Each of the primary and secondary virtual machines is operable to send a heartbeat message to the other of the primary and secondary virtual machines at intervals via the link. The heartbeat message indicates that virtual machine which sends the heartbeat message is alive, and additionally can include status information.

A test for liveliness could be performed following receipt of a heartbeat message. Alternatively, or in addition, a test for liveliness can be performed in response to an input action. Alternatively, or in addition, a test for liveliness is performed at an epoch boundary, wherein an epoch boundary forms a boundary between sections of code executed by the virtual machines.

A virtual machine, which is found to be in a fault state, can be terminated. The primary virtual machine can be operable to initiate a new secondary virtual machine where an existing secondary virtual machine is found to be in a fault state. Where an existing primary VM is found to be in a fault state, a secondary VM is promoted to become the new primary.

It should be noted that an embodiment of the invention may have more than one backup VM.

The invention also provides a computer program product operable when run on a computer to provide a virtual machine for a redundant fault tolerant virtual machine architecture that includes a second virtual machine. The virtual machine is operable to form a replica of the other virtual machine by replicating operations performed on the other virtual machine. The virtual machine is further operable to test for equivalent operation of the other virtual machine at predetermined stages of operation. The computer program product can be provided on a carrier medium, for example a computer readable medium (e.g., a disc or tape or other computer readable storage or memory medium) or a data transmission medium (e.g., a telephone line, electromagnetic signal or other transmission medium).

The invention also provides a method of providing software fault tolerance comprising the provision of replicated virtual machines including at least a primary and a secondary virtual machine, wherein the secondary virtual machine replicates operations performed on the primary virtual machine, and the primary and the secondary virtual machines co-operate so as mutually to provide fault tolerance.

In an embodiment of the invention, transparent fault tolerance can be provided for applications executed by an rVM. The interface between applications and the rVM can be identical to the interface between the applications and a non-replicated VM.

Support can be provided for both applications that require strong internal and external consistency, and for applications with relaxed consistency requirements. Internal consistency requires that the states of the replicas are the same, or appear to be the same as seen from their environment. Relaxed internal consistency applies this rule to some part of the state of the replicas. External consistency requires that the interactions between the replicas and their environment appear as if performed by a non-replicated entity. Relaxed external consistency applies this rule to a subset of the interactions between the replicas and their environment. An embodiment of the invention can be suitable for applications that require some critical actions to be performed even in the presence of component failures. It is to be noted that such applications could not use a technique such as a transaction mechanism, e.g., transactions that are based on: detect failure, abort action, do backward recovery. Although it is sometimes suggested that a transaction mechanism provides fault tolerance, in fact it provides concurrency control (it can allow multiple read/write operations to proceed in parallel with the effects being equivalent to a serial execution of the operations), and guarantees that the results of the operations/ transactions persist (on disk or similar). A transaction mechanism does not actually tolerate failures, but simply detects failures and rolls back to a previous consistent state of data.

The failure detection and masking mechanisms in an example of an rVM in accordance with the invention can be integrated with corresponding application-level language constructs. For example, language constructs such as exceptions (e.g., try-catch-throw in Java) are used in an embodiment of the invention. Transparent detection and recovery for some failures can be provided. However, an application may want to do some application specific processing of some failure notifications, and some failures allow only application-level recovery. Implementing the fault tolerance mechanisms at the VM level makes it possible to co-ordinate the tasks performed at this level with the similar tasks performed at the application level.

BRIEF DESCRIPTION OF THE DRAWINGS

Exemplary embodiments of the present invention will be described hereinafter, by way of example only, with reference to the accompanying drawings in which like reference signs relate to like elements and in which.

DESCRIPTION OF THE PREFERRED EMBODIMENTS

Figure 1:
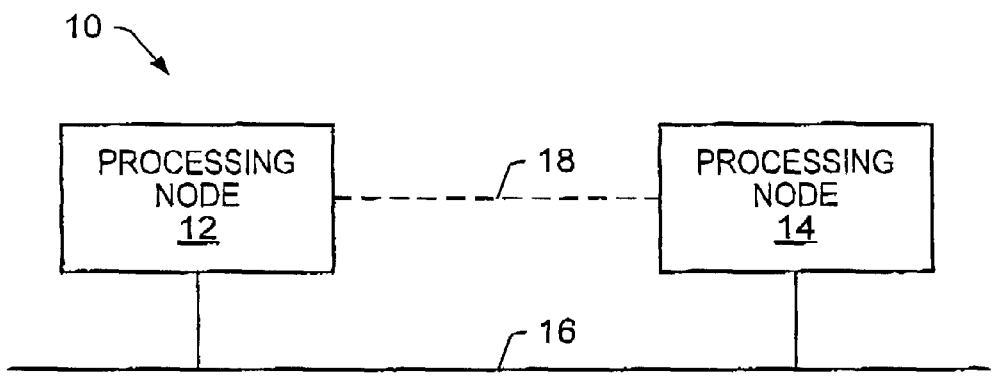
FIG. 1 is a schematic overview of a system in which an embodiment of the invention may be implemented for providing software fault tolerance.

An embodiment of the invention aims to provide transparent software fault tolerance. By transparent software fault tolerance is meant that a number of software components (in an embodiment of the invention, a number of virtual machines) can detect and recover from faults that are not masked by the underlying software and hardware environment, making these faults transparent to the higher layers of software.

As mentioned above, an embodiment of the invention for providing transparent software fault tolerance can be described as "a replicated virtual machine" and is referred to hereinafter as an "rVM". This provides a new approach in which both a unit of replication and a component that implements the fault tolerance mechanism is a virtual machine (VM). When seen as a "black box", a typical VM takes as inputs application code and the values and events that originate from the VM environment (e.g., values read from some external registers, software or hardware interrupts, exceptions and traps). External events trigger VM actions. The same typical VM produces as outputs the values written to the VM environment and actions which may initiate some activities in this environment (e.g., values written to some external registers, VM actions which initiate some IO processing). In addition to inputs and outputs that come from executing application code, a VM can internally generate some inputs and outputs. An example of a virtual machine is a Java VM.

An implicit characteristic of a VM is that it has full knowledge of the semantics of the application-level code. In particular, it knows for each application-level statement the category to which that statement belongs. For example, it can belong to one of the action categories shown in FIG. 5. A VM also knows the application-level model of exceptions and the statements that are related thereto. A VM performs a mapping between this application-level view of exceptions, and the underlying OS model of traps and signals (i.e., synchronous and asynchronous external actions), using an rVM model of external actions as an intermediate view. The processing of external actions takes into account the semantics of both the higher, application-level, view and the lower, OS-level, view of external actions. An embodiment of the invention takes advantage of these intrinsic aspects of a VM. For example, since a VM as used by the invention has full knowledge of the semantics of application-level code, fault tolerance mechanisms can be provided by the VMs without requiring any increase in application complexity.

Fault tolerance requires redundancy, which can be either of a state or computation, and can be either in space or in time. Redundancy introduces the problem of coordinating replicated states and computations, and there are a number of known ways of doing this. In active replication, all the replicas are equal, perform the same steps, and appear as a single entity to their environment. It is assumed that all the steps in such computations are either deterministic, or that any non-deterministic choices (e.g., input values, or order of external interrupts) are resolved in identical deterministic way by all the replicas. The details of how this is done depend on each specific algorithm for active replication. In passive replication there is a distinguished or primary replica and the other replicas are backups or secondaries. The primary resolves the non-deterministic choices and informs the backups about its decisions. The state of the backups can be more or less tightly synchronised with the state of the primary, but the backups are always behind the primary. Again, the details depend on each specific algorithm for passive replication.

An rVM forming an embodiment of the invention can have some characteristics of both active and passive replication. Similar to active replication, the VM replicas of an rVM perform the same computation which may be configured to run in parallel (with some exceptions), but may also be configured so that backups are delayed with respect to primary's computation. The existence of a primary VM replica lends an rVM a characteristic of passive replication. The basic operation of an example of an rVM can be summarised as follows:

The primary and backup VM replicas start in identical states. The next action executed by the primary VM replica and the next action executed by the backup VM replica are identical for the corresponding positions in their respective computations.

The state of the VM is the same, at both primary and backup VM replicas, after executing the same action in the same starting state.

Some types of actions (read from the environment, write to the environment, asynchronous actions from the environment) require additional processing by the replicas in order to resolve non-deterministic choices, and to maintain both internal and external consistency of the VM replicas.

After a failure of the primary VM replica is detected, a backup VM replica is promoted to become the new primary VM replica. After a backup VM replica is lost, a new backup VM replica is created and is re-integrated with the primary VM replica. FIG. 1 is a schematic overview of a particular embodiment of the invention, in which first and second VM replicas are executed on first and second nodes 12 and 14 of a multi-computer network 10. One of the first and second VM replicas is operable as a primary VM replica and the other is operable as the backup, or secondary VM replica. In addition, each of the replica VMs regularly send a heartbeat to the other of the VM replicas in order that the VM replicas can monitor the correct operation of each other.

It should be noted that although, for the present embodiment, only first and second nodes and first and second replica VMs are described, another embodiment of the invention could employ more than two nodes and two VMs. The nodes 12 and 14 are linked by a network connection 16, and optionally via an additional connection 18. An additional connection 18 can be provided, in particular, where the main network connection, which could be a bus a serial or parallel connection, does not have a high enough capacity to enable the rapid exchange of information between the nodes 12 and 14. Another reason for having redundant links is the assumption made by this invention that system partitioning cannot happen (the case when both nodes are functioning but cannot talk to each other). Since another assumption is that there can be a maximum of a single failure at a time, redundant links mean that partitioning is not possible.

Figure 2:
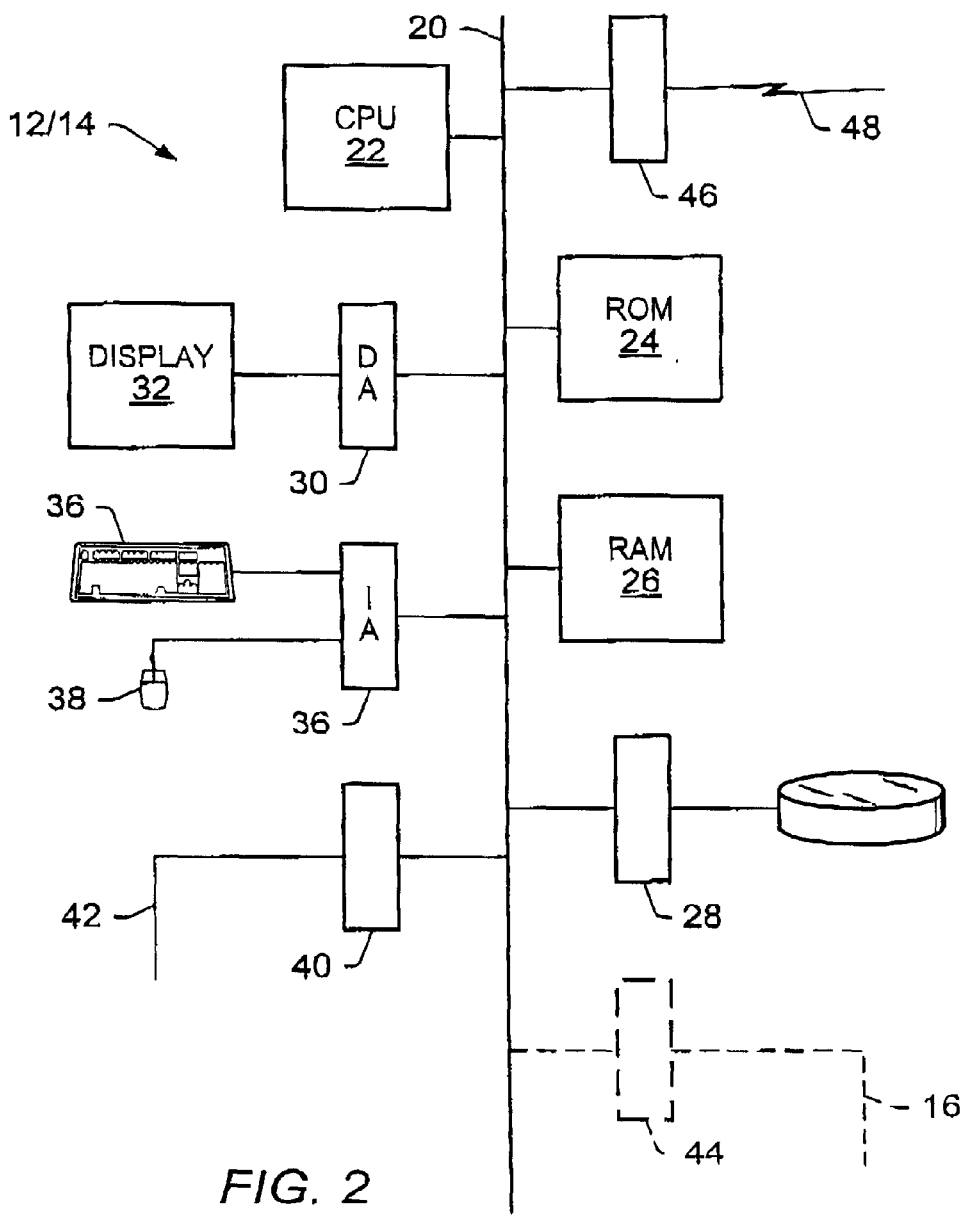
FIG. 2 is a schematic representation of a hardware configuration for a node of the system.

Each of the nodes 12 and 14 could be implemented as a conventional computer. FIG. 2 is a schematic illustration of one possible configuration for such a node. A bus interconnects various system components. The units connected to the bus include one or more central processing units (CPU) 22, read only memory 24, random access memory 26 and a storage interface 28 for storage 29. An optional display adapter can provide for the connection of a display device 32. Also, an optional interface adapter 34 can provide for the connection of input devices such as a keyboard 36 and a mouse 38. A network interface 40 can provide for the connection to the network interconnection 16 via a line 42. An optional additional interface 44 can provide a connection to the direct link 18. A further interface 46 can provide a modem or digital interconnection to an external line 48. It will be appreciated that the configuration shown in FIG. 2 is merely illustrative of a possible configuration for a node and that many alternative configurations are possible.

Figure 3:
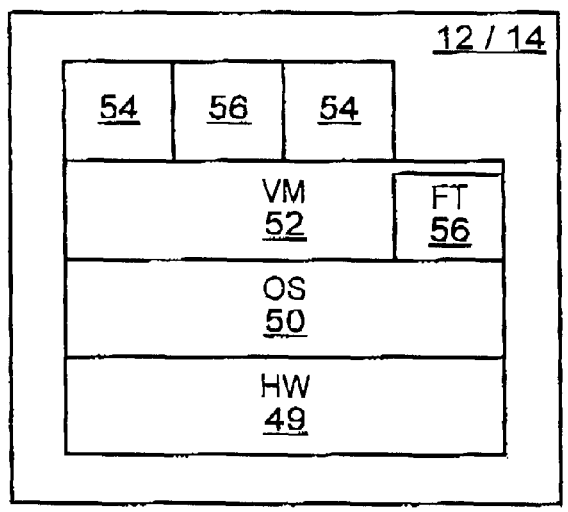
FIG. 3 is a schematic representation of a software configuration of a node of the system.

FIG. 3 represents the software configuration at a node 12/14. As shown in FIG. 3, an operating system 50 runs on the hardware 49 of the node 12/14. A virtual machine 52 operates in turn on the operating system 50 and includes fault tolerance components 56. One or more applications 54 operate on the virtual machine 52. It is the combination of the virtual machine 52, including the fault tolerance component(s) 56, on each of the nodes 12 and 14 that provide an example of a rVM according to the present invention.

Transparent fault tolerance can be provided for applications executed by an rVM according to the invention. An application can choose whether or not to use the fault tolerance mechanisms of the rVM. If these are not used, the application should not have a significant extra cost compared to execution on a non-replicated VM. The interface between applications and the rVM is identical to the interface between the applications and a non-replicated VM. Ideally there should be no penalty, but some exceptions will exist (e.g., applications running on an rVM will be slower due to extra processing) and a management interface may be provided that will make the fault tolerance features of the rVM visible to some applications.

Support can be provided for both applications that require strong internal and external consistency, and for applications with relaxed consistency requirements. Internal consistency requires that the states of the replicas are the same, or appear to be the same as seen from their environment. Relaxed internal consistency applies this rule to some part of the state of the replicas. External consistency requires that the interactions between the replicas and their environment appear as if performed by a non-replicated entity. Relaxed external consistency applies this rule to a subset of the interactions between the replicas and their environment. An rVM should be suitable for those applications, which require some critical actions to be performed even in the presence of component failures. Such applications cannot use some other existing techniques, e.g., transactions that are based on: detect failure, abort action, do backward recovery.

The failure detection and masking mechanisms in an rVM can be integrated with corresponding application-level language constructs. The chosen language constructs in the present example of an rVM are exceptions (e.g., try-catch-throw in Java). An rVM provides transparent detection and recovery for some failures. However, an application may want to do some application specific processing of some failure notifications, and some failures allow only application-level recovery. Implementing the fault tolerance mechanisms at the VM level makes it possible to co-ordinate the tasks performed at this level with the similar tasks performed at the application level.

For example if an application issues a request to allocate some memory and receives the "out of memory" response, the application may want to catch this and do some application-specific recovery. Another application may want the rVM to treat this as a replica's failure followed by a switch over to a new replica. There are instances when the rVM processing must be co-ordinated with the application-level processing. For example, the rVM may decide to order some asynchronous actions in a specific way or to deliver them at some specific point. However, this should take into account that the application may be sensitive to both the exact point of delivery for these actions and to their order of delivery.

Before describing an example of an rVM forming an embodiment of the invention, there follows a description of some assumptions on which the example of an rVM is based.

Various characteristics of a VM are taken into account. For example, the interface between the VM and applications is typically a well-defined set of instructions. The VM executes the actions associated with these instructions either by passing them to the underlying layers or by doing some additional instruction-specific processing. The set of instructions a VM itself can execute is typically well defined, as well as the interface between the VM and the underlying layers (e.g., between the VM and OS). Each rVM action belongs to one of the pre-defined classes of actions (e.g., internal or external, IO or non-IO, synchronous or asynchronous) illustrated in FIG. 5.

As mentioned above with reference to FIG. 1, the present rVM runs on a distributed computing system with each VM replica 52/56 running on a different node 12 or 14, and with each node 12 or 14 running its own operating system (OS) 50. All the nodes must provide the same OS interface to the rVM. Some nodes may have some other fault tolerance mechanisms implemented in hardware or other lower software layers, but they are considered independent from the rVM mechanism. An exception to this is that a failure detector from a lower layer can be used by the rVM in some instances.

Communication delays and processor execution time must have known maximum values because the rVM uses time-outs (among other things) to detect a failure of a replica VM.

A reliable transport mechanism is provided between the nodes because VM replicas themselves are not arranged to cope with lost messages or with re-ordered messages (note that a lost message can cause detection of a replica failure, because rVM assumes that the underlying transport mechanism guarantees reliable transfer of messages). In some instances this could be provided by a bus or network connection 16 between the processing nodes 12 and 14. However, in other instances a dedicated additional high capacity connection 18 could be provided as shown in FIG. 1. The reliable transport mechanism between the nodes provides for global ordering of messages. Where there are only two 2 VM replicas as in the instance shown in FIG. 1, FIFO ordering can be provided for inter-replica communication. The FIFO ordering can typically be done in software, by a communications protocol that runs within or outside the operating system. It could, however, be done by the interface 44, or by a separate FIFO mechanism.

Either all the VM replicas can read from and write to the same entities in the system environment or these environment entities themselves are replicated with a sufficient level of consistency (sufficient for the intended applications). This means that, for example, when the replicas are acting as a server, either all the replicas can communicate with the same clients (the clients in this case belong to the system environment), or the clients themselves are replicated and each server replica communicates with some client replica.

The semantics of the VM actions at the application interface do not depend on the execution time (e.g., exact start time or exact duration) of an action. Otherwise, some actions would have different meaning when run on the rVM since they will take longer to execute. If several application-level threads of control can simultaneously be active in an rVM, it is up to the applications to ensure (e.g., by using the language's synchronisation primitives) that such multiple active threads are correctly synchronised among themselves. The rVM does not control the way in which the application threads are scheduled on the available processors (such assignment of threads to processors can depend on the speed of the processors, OS scheduling policies, etc.).

Also, the semantics of the VM actions do not depend on the number or characteristics of the real OS and hardware resources on a specific node (e.g., memory size or node name). An application running on an rVM will have its replicas running on different nodes, and such dependencies would cause the computations to diverge (however, an rVM does allow relaxed consistency using local states and local actions, making this restriction less significant).

It is assumed that hardware and software components can fail by crashing and this is detectable with a sufficiently high probability. Omission and timing failures are allowed, but Byzantine behaviour and system partitioning is disallowed. The present rVM can recover from some specific failures in addition to crash, timing and omission, but not from general Byzantine failures. The risk of system partitioning can be avoided with the use of redundant node inter-connections as described above. The allowed failures can be caused for example by design, coding, or integration faults. Failures can result in particular from transient faults, which can be caused by overload, timing, and various exceptional circumstances.

The present example is based on the two VM replicas, each operable on a separate processing node, which allows only single point failures. However, this is not an inherent restriction of a rVM, which could be generalised to include more than two VM replicas as mentioned above.

Support for exception handling is provided at the application level. There are some language constructs that allow associating exception handlers with regions of code (e.g., Java or C++ exceptions). Exception handling allows both backward and forward error recovery. In rVM the exception model can be enhanced with some additional properties to provide better support for recovery.

In order to resolve some kinds of non-determinism, an rVM uses the concept of epochs (blocks of application code which have pre-defined lengths). The epoch boundaries are observed, so that control is transferred to the rVM at these points. As the fault tolerance mechanisms are implemented at the VM level, this requirement can readily be satisfied, for example by using software instruction counters or by treating some actions as enforced epoch boundaries.

There now follows a description of an embodiment of an example of an rVM forming an embodiment of the invention that takes account of the assumptions described above. It should however be noted that other examples and embodiments of the invention may be based on different sets of assumptions. In such cases consequential changes may be required to the algorithms and/or logic employed by the VM replicas.

The present example of an rVM is derived from an existing Java VM (JVM) with necessary additions and modifications.

A typical Java VM consists of the core VM (which can include a memory manager, thread schedules, stack frame manager, interpreter, Just In Time compiler) and standard Java libraries, which are used by the core VM (e.g.,: java.lang.*, java.io.*). These Java libraries in turn use the native system libraries (e.g., those for file interface, memory management, thread and signal management, socket interface). All interactions between the VM (both core VM and standard Java libraries) on the one hand, and the VM's environment on the other hand (either native system libraries or direct calls to the system's OS) have to be identified, and the corresponding actions categorised according to the rVM action hierarchy (internal, external, etc.). Examples of such interactions are:

VM's memory manager requests memory allocation when creating a new object instance;

OS alarm clock signal arrives that drives the VM's scheduler;

VM's class loader reads a Java class file from network or from a local system's disk.

Once all such actions are identified, and their action categories determined (based on the action semantics), there is some additional processing which rVM performs for such actions—as compared to the processing which is done by the corresponding non-replicated VM. The kind of additional processing which has to be done for each specific kind of action is detailed hereinafter.

Failure detection in the present embodiment of the invention will now be described.

Both the primary and backup VM replicas test for a "failure detected" state (fd-state) at a number of points in their executions. This state can be entered if one of the following is true: if some condition related to heartbeat messages is fulfilled; if a time-out at one of the synchronisation points has expired; if a disagreement on an output value has been detected; or if some external failure notification has been received.

Figure 4:
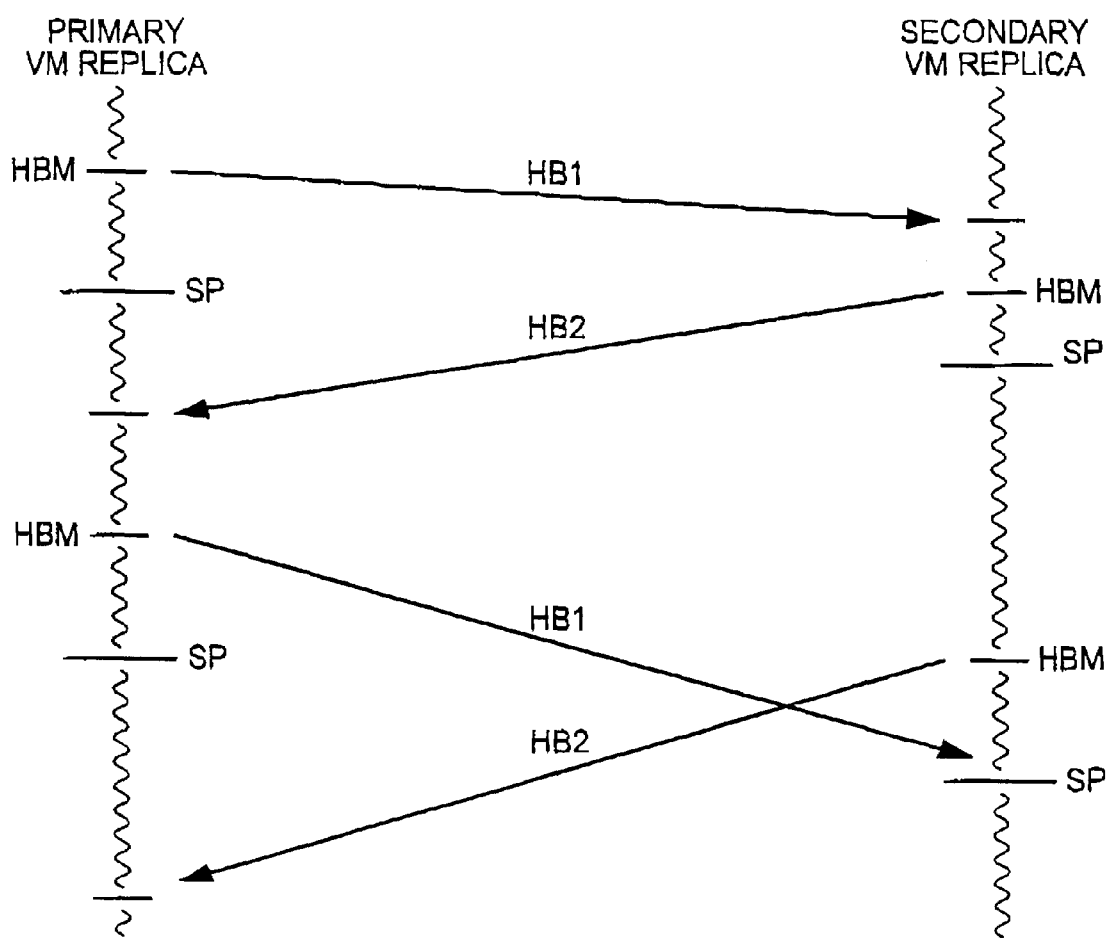
FIG. 4 is a representation of a message transfer between nodes at synchronisation points.

As mentioned earlier, both replicas periodically exchange heartbeat messages and this can cause one of the replicas to enter an fd-state. FIG. 4 is a schematic illustration of the execution of the primary and secondary VM replicas, where a heartbeat message (HBM) is sent periodically. Also shown in FIG. 4 are synchronisation points (SPs). A synchronisation point can coincide with an end of epoch, for example. It should be noted that heartbeat messages are one-way messages. Thus, for example, a heartbeat message from the secondary to the primary replica (HB2) is not sent in response to a heartbeat message from the primary to the secondary replica (HB1), and vice versa. Also, it should be noted that, although the reference HB1 is used for heartbeat messages from the primary replica to the secondary replica, and the reference HB2 is used heartbeat messages from the secondary replica to the primary replica, these references are used merely as labels according to the direction of the messages, and do not indicate any similarity, or otherwise, of the messages themselves. Indeed, each instance of a heartbeat message sent by a replica may be different, as it can contain state variables. For example, each instance of HB1 may be different.

In the present example of an rVM, the heartbeat messages can contain not just "I am alive" information, but also state (or signature of state) information that can assist in faster and more accurate failure detection. Such state information can include, for example, a stack size, a number of threads, a state of each thread, etc. Each heartbeat message can also contain an "incarnation number" field, which can be used to detect if an old primary or backup VM replica unexpectedly reappears. An fd-state is entered if a replica does not receive a certain number of heartbeat messages, or receives them but they indicate that the other side has failed (or is not making progress, or does not satisfy some other pre-defined correctness condition). The exact contents of the heartbeat messages and the manner in which it is decided that a replica has failed can be selected as required for a particular implementation and are not relevant for an understanding of the present invention.

There are several possible synchronisation points in both the primary and backup VM replica, and if a time-out expires at one of these points the fd-state is entered. Possible synchronisation points are input actions and epoch boundaries. Also, the output values of the replicas can optionally be compared under some conditions (if the epoch skew between the replicas is set to 0). If this is done and a disagreement between the replicas is detected, then again the fd-state is entered. Note that when the outputs are compared, the details of what is considered a disagreement (e.g., a value out of some correctness interval), and the manner in which the winner/loser is decided, are action-specific, can be selected as required for a particular implementation, and are not relevant for an understanding of the present invention.

Additionally, fd-state can be caused by other, external to rVM events, for example as result of a node, OS, or communication failure. Such external events can be delivered to rVM by some external failure detector module.

Primary and backups check and process the fd-state at the epoch boundaries and at the places where disagreement on output value or timed-out condition can occur. When one of these failures is detected, applications do not need to be involved as the rVM will recover from them. A management interface can be provided to monitor such failures. Also, some applications may require notification about some of these failures so that they can be processed in an application-specific way. For example, a notification of "node failure" for the backup VM replica's node may be given to the application replica on the primary node, where it is processed by the catch clause of a try statement.

When the primary VM replica detects it is in fd-state, a new backup VM replica can be created and a create message (with a "reintegrate" argument to distinguish this from a backup VM replica's cold start) can be sent to an appropriate node. The algorithm for deciding where to create a new backup VM replica can be selected as required for a particular implementation, and is not relevant for an understanding of the present invention. The primary VM replica will then suspend its processing. When the backup VM replica is created the primary VM replica will send its state to it and continue its processing. The parts of the state that are sent can include a default-virtualised and virtualised state, the latter being sent together with some control information which will allow the backup VM replica to unvirtualise the values. The rVM allows local or context dependent state and actions to exist at each VM replica. This creates a problem when a new backup VM replica is being re-integrated, in that the backup VM replica's local state will be out of date, and the preceding local actions will not be done, potentially leaving the backup VM replica's environment in an out of date state. This problem can be alleviated by generating special "reintegration" asynchronous action thus allowing applications to catch this and to re-initialise the local state and local environment if this is what they want to do. Note that backup VM replica's local state includes the VM's internal local state (not directly visible to applications), but this state can be re-initialised by the VM replica, since it knows that it is being re-integrated.

When the backup VM replica detects it is in fd-state it can do all the epochs until the failure epoch is reached (the epoch within which the primary VM replica failed). It is safe for the backup VM replica to do even the failure epoch, until a synchronisation point is reached for which there is no synchronisation request from the primary VM replica. This synchronisation point may be one of an input action, an output action, or the end of epoch (depending on the specific configuration of rVM and on the specific epoch). This synchronisation point is the take-over point—where the backup VM replica becomes the new primary VM replica. The same replica will process its queues of asynchronous and output actions (the latter queue contains asynchronous output actions which require acknowledgements), delivering asynchronous actions (if any of them is an acknowledgement then remove the corresponding output action from its queue) and for the rest of the output queue returning "transient error" completion status for the outstanding output actions. The rVM does not do things like retry of idempotent output actions or any other output-specific recovery, such recovery actions are left to applications. After the backup VM replica has been promoted into the new primary VM replica it does re-integration of a new backup VM replica, as described above.

The state of a VM replica consists of the values assigned to all of its variables; the values may be stored in registers, memory, or on a disk. A part of the state may be "virtual", that is be mapped to different values from the original values when these were obtained from the VM environment. Such virtualised values can be exchanged directly between the replicas (in order to keep the replicas consistent); replicas with the virtual state will still satisfy the internal consistency requirement. This can be used for example, to implement virtual file and process identifiers. Both replicas must be able to translate from virtual values to their corresponding local values.

A part of the state can usually be exchanged between VM replicas without any mapping, as these variables are not dependent on the local context. And finally a part of the state may be dependent on the local context in such a way that it does not make sense to copy it directly or even to copy it in some virtual form. This part of the replica state has to be known to the rVM as such which will allow each replica to have different values in this part of their state, (even with the existence of local state the relaxed internal consistency is still satisfied). This part of the replica state can be made known to the rVM at compile time, or be determined dynamically at run-time. The manner in which it is made known to the rVM is not relevant for an understanding of the present invention.

Thus, the state of a VM replica can consist of up to three disjoint parts, namely a virtualised, default-virtualised, and local or context dependent part. Account has to be taken to ensure that when a new backup VM replica is being re-integrated, the resulting local state and local actions of the new replica are not out of date.

Figure 5:
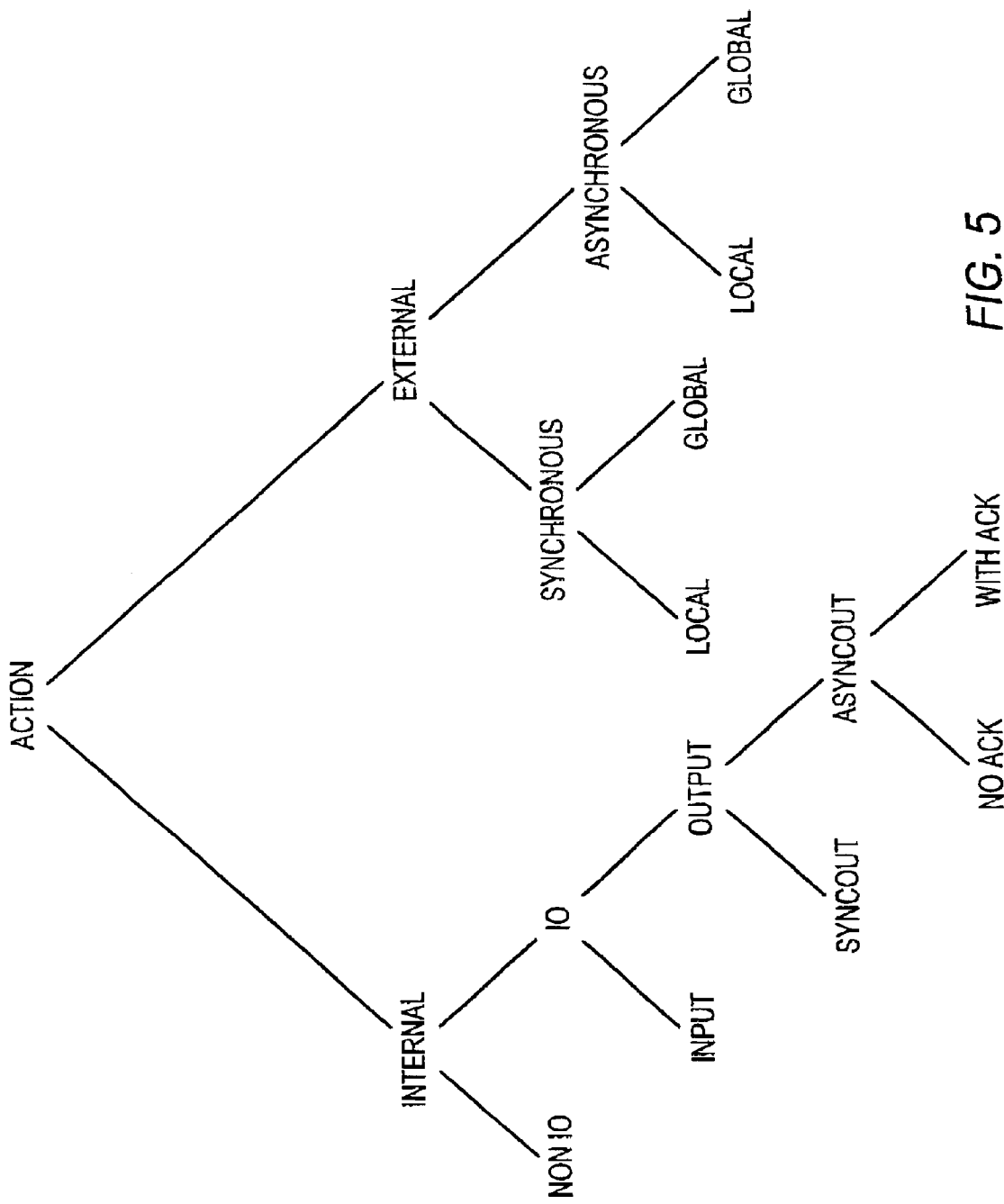
FIG. 5 is a representation of relationships between classes.

An action of a VM replica can modify the replica's state and write some value to the replica's environment. An action belongs to one of the several pre-defined action classes that are represented in FIG. 5. It is assumed that a VM replica can decide for each of the actions the class to which the action belongs.

Internal actions are performed in the order determined by the control flow of a VM replica (in the absence of external actions this order is deterministic). IO actions read from or write to the VM environment. All IO actions can result in some IO activity in the VM environment. An input is constrained always to be atomic or indivisible (but it may have some duration). An output action is either synchronous or asynchronous. The latter returns when a request is sent that initiates an IO activity. When this external activity is finished, optionally (this is output action-specific) an external asynchronous action may be delivered to the same VM replica which initiated the activity as an acknowledgement for the output action and will typically contain a completion status for the output action (e.g., success, transient failure, unrecoverable failure). A synchronous output requests an IO activity in the environment, and then waits until some completion value is made available to the VM replica (roughly, it can be seen as an output followed by an input, performed as an indivisible action).

External actions are performed by a VM replica when triggered by its environment. These actions (or events that cause them) are sometimes called exceptions, but this practice is not followed here since this term has specific meaning in some programming languages. External actions or the corresponding events are also called: signals, interrupts, traps. External actions can be synchronous or asynchronous with respect to the normal control flow of the VM code, i.e., with respect to internal actions. It is assumed that the values (if any) and order of the external synchronous actions are deterministic, while the values (if any) and order of the external asynchronous actions are non-deterministic. An external action has a non-deterministic value if a single instance of this action can be delivered to different replicas with different value. An external action can be local (delivered to some but not all the replicas) or global. In the rVM, an external action is either strictly global (when it occurs it must occur at all the replicas), or weakly global (when it occurs it may be either local or global).

Some external actions may be caught and handled by the application code. This means that their point of delivery and order of delivery cannot be arbitrarily changed by the rVM (handling of external actions at the application level may depend on the exact point and order of delivery).

Some examples of specific external actions are given below.

| | |
|---|---|
| exception on "divide by zero" | synchronous strictly-global |
| exception "out of memory" | synchronous, can be local or global (after an attempt to allocate memory) |
| signal "control-C" received | asynchronous, weakly-global or strictly-global depending on the process model provided by the underlying OS (occurs when a signal is sent to kill a replica) |
| event "message received" | asynchronous, can be local or global, depending on the underlying transport mechanism. |

External actions require some special processing to be done by rVM. More detail about the rVM processing at the primary VM replica and backup VM replica is given later. Note that some implementations of rVM may restrict the described state-action model (e.g., may not support acknowledgements for asynchronous output actions).

As an example, for each of the possible actions (instruction of rVM and external events which can be delivered to rVM), the rVM can pre-define a descriptor, which can be implemented as a bit-field, where each of the bits is a Boolean flag and their meanings are shown below:

Internal action descriptor

| | |
|---|---|
| bit 0 = 0 | internal action indicator |
| bit 1 | non IO or IO action |
| bit 2 | non-input or input (meaningful only if IO) |
| bit 3 | non-output or output (meaningful only if IO; both input and output is illegal) |
| bit 4 | non suppressed at backup or suppressed at backup (i.e., local action or non-local action) |
| bit 5 | value virtualised or not virtualised (can be virtualised only if the action is suppressed at backup) |

-continued

| | |
|---|---|
| bit 6 | output values not compared or output values compared (comparison done for faster failure detection) |
| bit 7 | synchronous output or asynchronous output |
| bit 8 | no acknowledgement or there is acknowledgement (for asynchronous output) |
| External action descriptor | |
| bit 0 = 1 | external action indicator |
| bit 1 | synchronous or asynchronous external action (an action cannot be both) |
| bit 2 | weak global (local or global) or strict global |
| bit 3 | ignore or kill semantics (for weak global and suppressed at backup) |
| bit 4 | not suppressed at backup or suppressed at backup |
| bit 5 | value virtualised or not virtualised (can be virtualised only if the action is suppressed at backup) |

In the rVM, the usual try-catch statement of the exceptions model can optionally be augmented as shown below:

| Original: | Becomes: |
|---|---|
| try { | try { |
| | save_object_state(); |
| --- | --- |
| } catch (exception e) { | } catch (exception e) { |
| | restore_object_state(); |
| --- | --- |
| } | |

This will allow easier use of exception handlers for backward recovery (e.g., in Java, on entry into catch-clause only the synchronisation-related operations are automatically undone, leaving the object in a potentially inconsistent state). The above save and restore can be provided either by the applications themselves, or some default or inherited save/restore may be used—in any case these fuinctions are called by the rVM but are not provided by the rVM.

Some interactions between the language constructs and the rVM can exist. For example, before the end of: try, catch, and finally block of the exceptions model an "end of epoch" can be forced in order to allow any asynchronous actions received within the block to be delivered within the same block.

In addition to the optional change in the semantics of the try statement, the rVM may introduce some new exceptions.

Multi-threading can potentially introduce non-determinism into replica computations.

The rVM does not use or implement deterministic scheduling of threads, instead it relies on applications, i.e., on their use of the standard synchronisation primitives, to protect computations in different replicas from diverging. However, if several threads have the same asynchronous action enabled, the decision as to which thread should receive a specific instance of this action must be made by the thread package in a deterministic manner. Some existing thread packages may need to be modified in order to satisfy this requirement.

Different application domains will place different emphasis on the various features of rVM (e.g., efficiency versus reliability). There are a number of rVM parameters which can be set differently for each instance of the rVM, but in each case they will have to be equal in the primary VM replica and backup VM replica(s) of a single rVM instance. Some of these parameters are listed below.

Action attributes (with possible scope for each):
1. "(un)virtualise value" is required (for various sources of local non-determinism; per input/output action)
2. "suppress action at backup" is required (i.e., local actions; per input/output action; possibly can be made to depend on action's arguments)
3. "compare output values" is required (for faster failure detection; per output action)
4. try/catch preserve state consistency (per try statement, or per object/class, or per rVM)
5. various time-out values (per rVM).

Additionally, there are two parameters related to epochs:
1. Maximum epoch length. This is given as number of certain application-level instructions per epoch (the scope is rVM). Longer epochs mean less overhead at epoch boundaries but also longer delays for deliveries of asynchronous actions. In the present rVM, epoch boundaries are enforced:
   1. After an output action;
   2. Before the end of a try-block, catch-block of the try-catch exception statement (which exist at the application/language level);
   3. When the maximum per epoch number of application's internal actions has been reached without encountering any of the first two conditions.

The third condition above can be optimised, so that rVM can count only some specific internal actions, e.g. only the branch instructions.
2. Epoch skew between primary VM replica and backup VM replica. This is given as a pair of numbers (d, D), where d is the number of epochs backup VM replica is allowed to come close to primary VM replica in their executions, and D is the number of epochs primary VM replica is allowed to move ahead of backup VM replica in their executions. The case d=0 is used for an "active replication"-like behaviour of rVM. D is bound from above by the space that is available at backup VM replica for various queues.

A backup has to stop its processing when it comes too close to the primary (i.e., when their distance in epochs is less than d) or when d is configured to be zero, and when continuing with further processing at backup would mean going ahead of the primary.

The primary has to stop its processing when it attempts to move too far ahead from a backup (i.e., when this distance in epochs would exceed D). This is checked at epoch boundaries—once within an epoch the primary can execute it without further checks.

In the following the processing of the primary and backup VM replicas is summarised. Processing related to local actions is not always shown in the diagrams. Also, processing of the internal non-IO actions and of the synchronous output actions are not shown but are to be implemented based on the description above.

Figure 6:
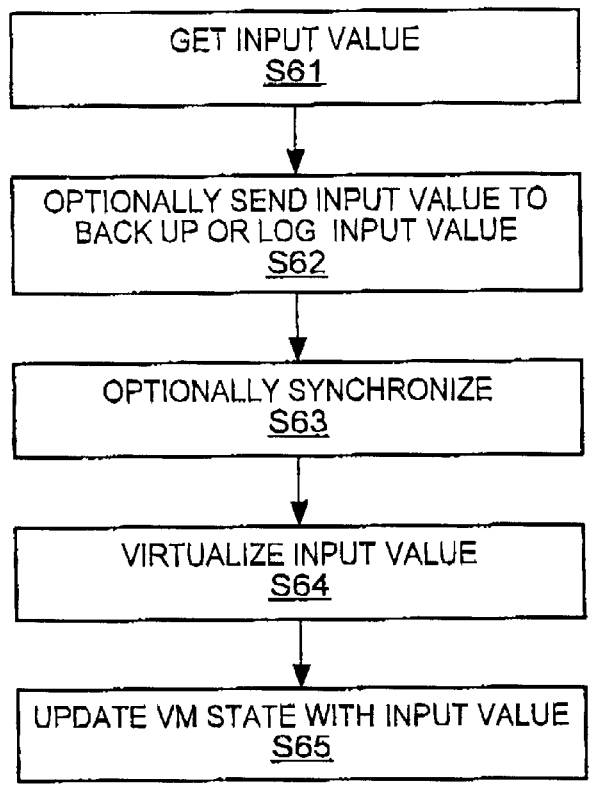
FIGS. 6 to 22 are flow diagrams representing operations performed at the primary and secondary virtual machine replicas.

FIG. 6 represents primary VM replica processing of an input action. Step S61 represents the primary VM replica getting the input value (e.g., reading the value from a register that is used by both VM and its environment). The primary VM replica performs the input action without changing the VM state (the value can be stored in a temporary variable in the local state). In step S62, the input value is optionally sent to the backup VM replica or logged locally, to be sent later. As indicated in step S63, the input action can optionally be a synchronisation point (which requires the primary to wait for the acknowledgement from the backup). In step S64, virtualisation of the input value is done if it is required for a specific action. In step S65, the primary VM replica updates the VM state with the input value.

Figure 7:
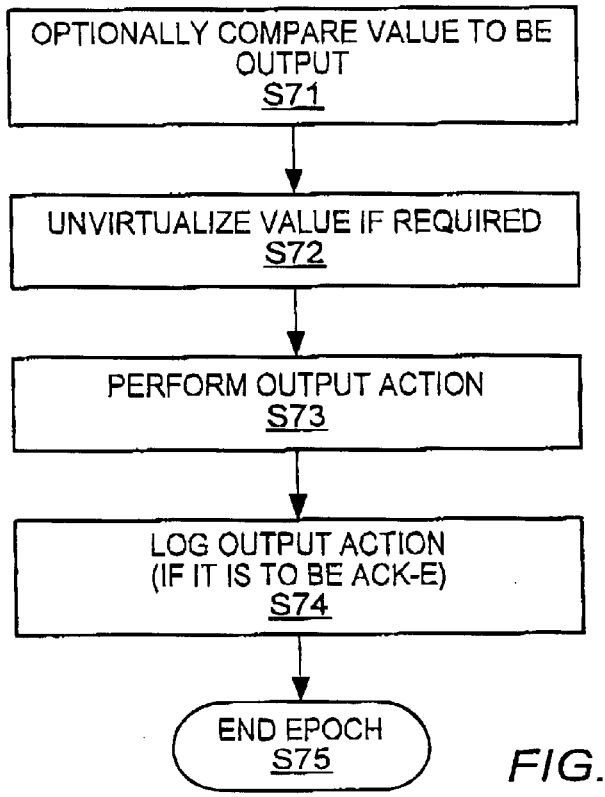

FIG. 7 represents the primary VM replica processing of an asynchronous output action. In step S71, comparison of the value to be output is effected for faster failure detection, if required for a specific action. The comparison requires that the primary and backup replica VMs exchange their output values. Unvirtualising of the output value is effected in step S72 if the same value was virtualised on input. The output action is performed in step S73 and is optionally logged in step S74 (an asynchronous output action is logged only if it is to be acknowledged). An output action at step S75 ends the current epoch.

Figure 8:
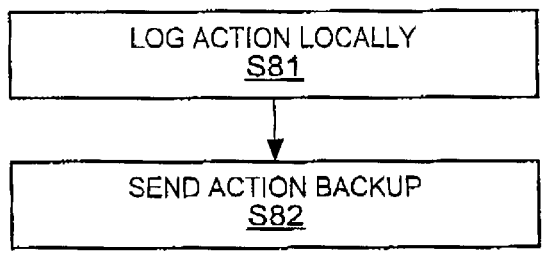

FIG. 8 represents the primary VM replica processing of an asynchronous external action. The action is logged locally in step S81 and also sent to the backup VM replica in step S82. No synchronisation is required at this point. Asynchronous external actions are delivered at epoch boundaries.

Figure 9:
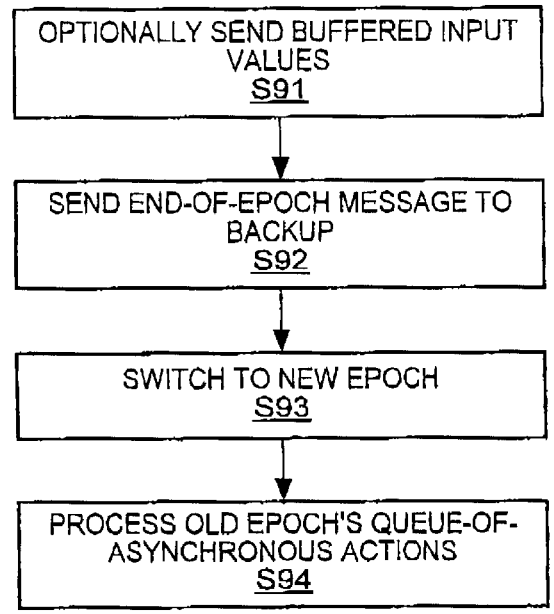

FIG. 9 represents the primary VM replica processing at an epoch boundary. Optionally, in step 91, buffered input values can be output. In step S92, an end-of-epoch message is sent to the backup VM replica and in step S93 a local switch to the next epoch is made. While doing this, asynchronous actions are disabled deferred (i.e., the new asynchronous external actions that arrive while the switch to the next epoch is being made will be processed as shown in FIG. 8 once the new epoch is entered). Then, before continuing with the next epoch, in step 94, the old epoch's queue of asynchronous actions is processed (i.e., they are delivered to application code).

Figure 10:
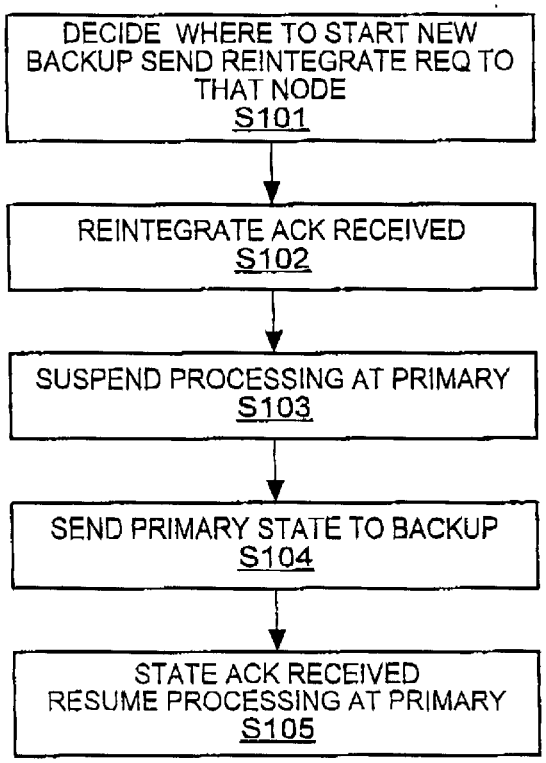

FIG. 10 represents the primary VM replica processing when a failure-detected state has been entered. The primary decides where to start a new backup and sends a request to that node (requesting reintegration) in step S101. When this request is acknowledged, the primary suspends its processing and sends its state to the newly created backup (steps S102, S103, S104). When the state message is acknowledged, the primary continues with its processing in step S105.

Figure 11:
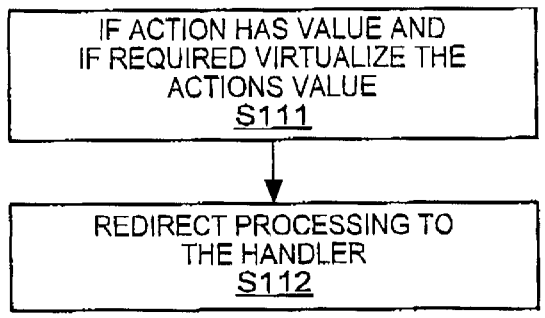

FIG. 11 represents the primary VM replica processing of strictly global synchronous external actions. The value (if any) of the action is optionally virtualised (S111) and the processing is redirected to the appropriate handler (S112).

Figure 12:
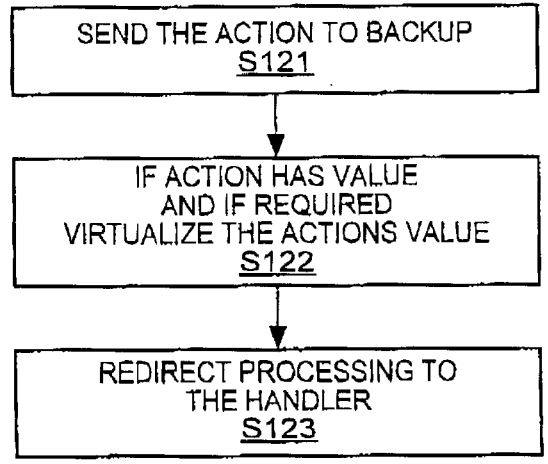

FIG. 12 represents the primary VM replica processing of weakly global synchronous external actions. The action is sent to the backup in step S121, and the remaining processing steps are the same as for the strictly global synchronous actions (steps S122 and S123).

Figure 13:
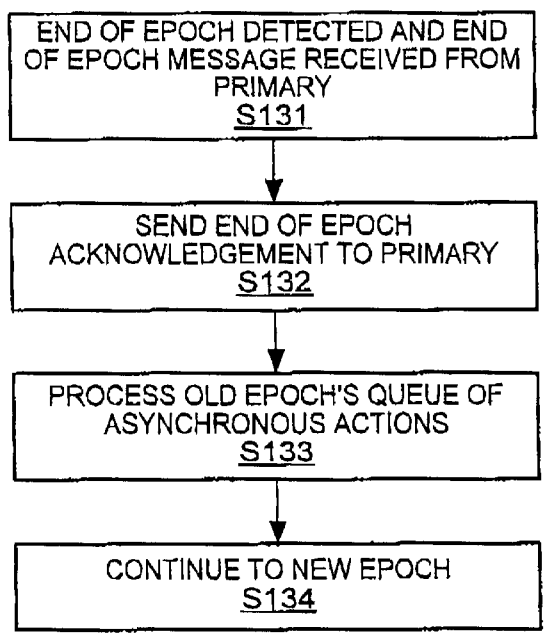

FIG. 13 represents the backup VM replica processing at an epoch boundary. When the end of epoch has been detected (step S131) and end of epoch message received from the primary, this message is acknowledged in step S132. In step S133 the old epoch's queue of asynchronous actions is processed, and then in step S134, it continues into the next epoch.

Figure 14:
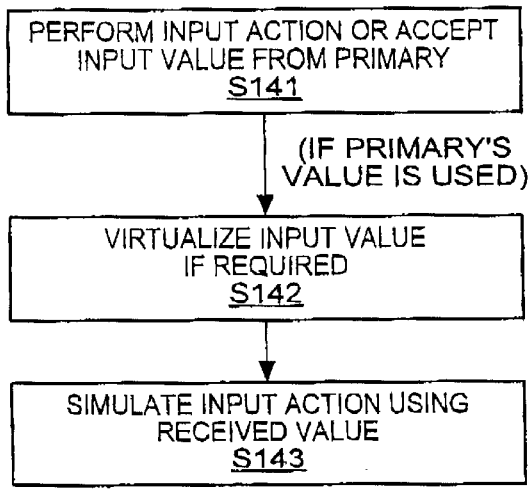

FIG. 14 represents the backup VM replica processing of an input action. If the action is not suppressed, in step S141 the backup VM replica performs the action with the value being entered into the local part of the backup VM replica's state. Otherwise, the backup VM replica will accept the input value sent by the primary VM replica (it can be temporary stored in the backup's local state). In step S142, the input value is virtualised, if this is required for a specific action. In step S143, the backup simulates the input action using the received value, and updates the VM state.

Figure 15:
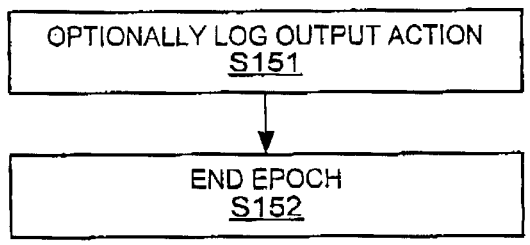

FIG. 15 represents the backup VM replica processing of an asynchronous output action. Most output actions will be suppressed at the backup VM replica, in order to have only primary VM replica's writes visible to the VM environment (but local actions are not suppressed). If no comparison of the output values is done, then in step S151 the backup VM replica optionally logs the output action (this is done only if the output action requires an acknowledgement). An output action ends the current epoch (S152).

Figure 16:
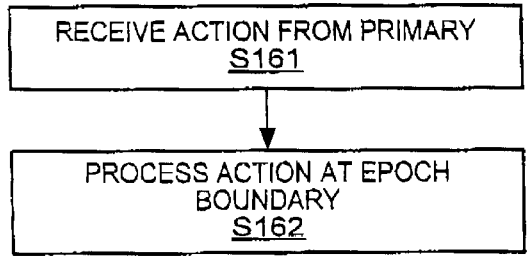

FIG. 16 represents the backup VM replica processing of an asynchronous external action. Such actions will in most cases be ignored by the backup VM replica, unless they are marked as "not suppressed by backup". In step S161, the backup VM replica receives such actions which are forwarded from the primary VM replica, and then in step S162, such actions are processed at epoch boundaries.

Figure 17:
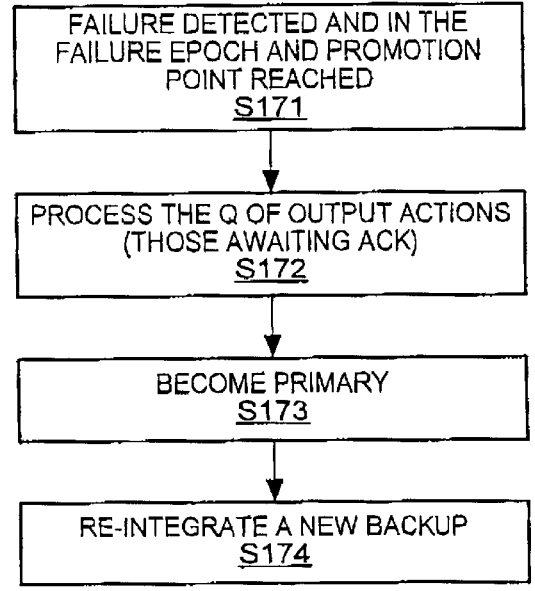

FIG. 17 represents the backup VM replica processing when a failure of the primary has been detected and the backup is in the failure epoch and no further progress can be made (S170). The backup replica processes the queue of output actions, and for each action: find what is the corresponding acknowledgement asynchronous action, initialise such an acknowledgement with value equal to "transient error"; and enqueue the asynchronous action (acknowledgement) for later processing. This is done in step S172; in step S173 the backup is promoted into primary, and in step S174 it re-integrates a new backup.

Figure 18:
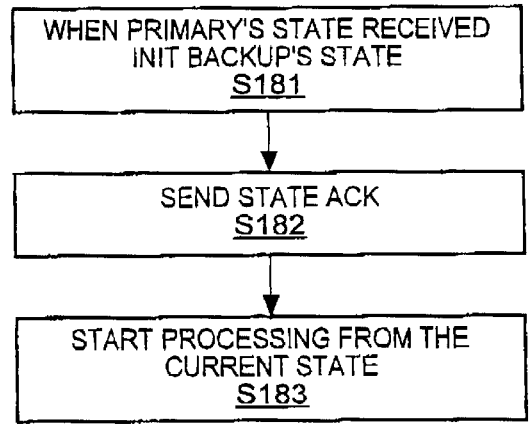

FIG. 18 represents the backup VM processing performed during reintegration. The backup uses the state received from the primary to initialise its own state (step S181). Then, it sends an acknowledgement to the primary (S182), and continues processing as the backup replica (S183).

Figure 19:
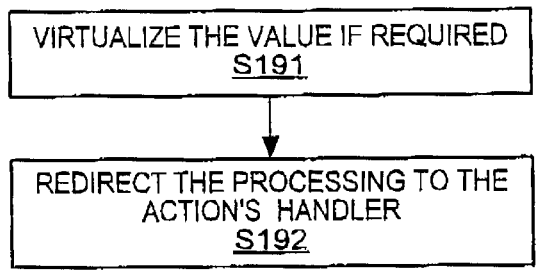

FIG. 19 represents the backup VM processing of strictly global synchronous external actions. In step S191, if the action has value and if it is required to do so, the value is virtualised. Then, in step S192, the backup's processing is redirected to the action handler.

Figure 20:
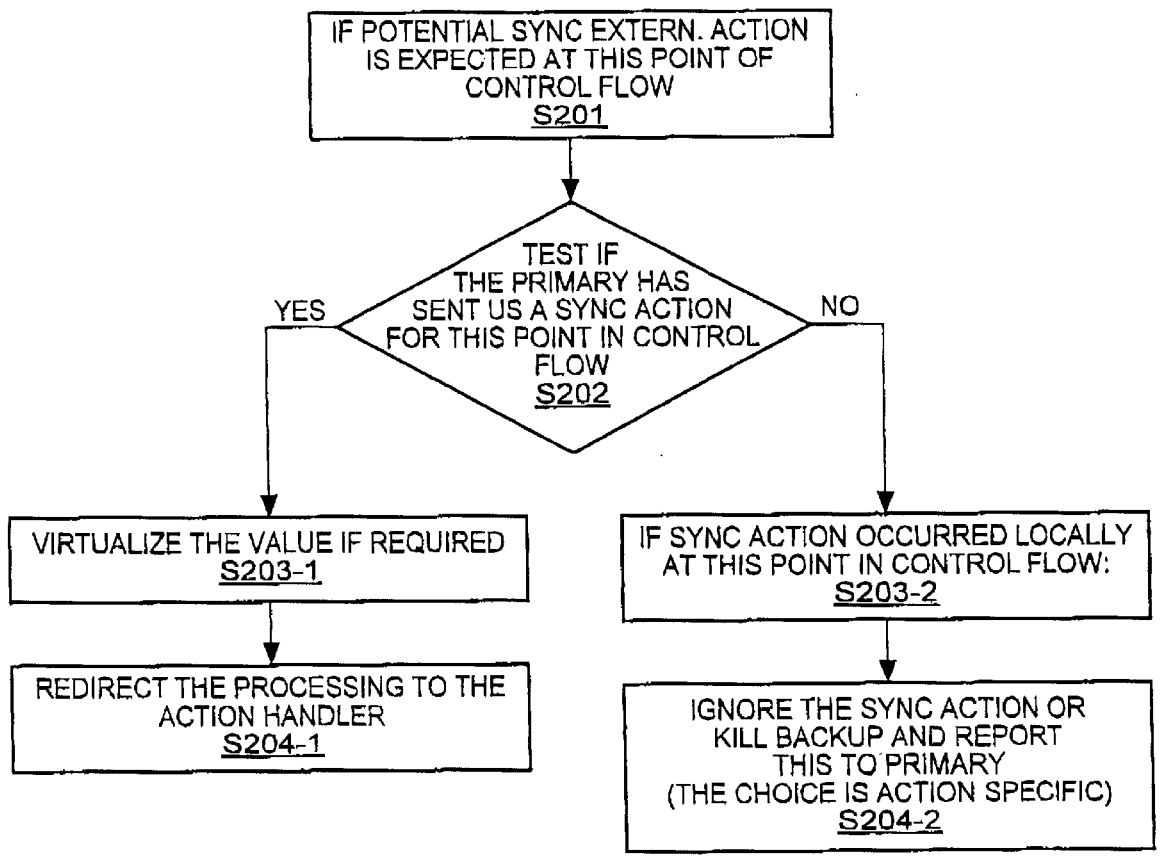

FIG. 20 represents the backup VM processing of weakly global synchronous external actions. This is done at every point of the control flow at which a weakly global synchronous action can be expected (S201). If the primary VM reported a synchronous action for this point in the control flow (in S202), the value is optionally virtualised (S203-1) and the processing is redirected to the action's handler (S204-1).

Otherwise, if the primary VM has not reported a synchronous action for this point, but a synchronous action has occurred locally (S203-2), this synchronous action is either ignored, or will cause the backup replica to kill itself, reporting this to the primary VM, the choice between ignore and kill itself is predefined and action specific (S204-2).

Figure 21:
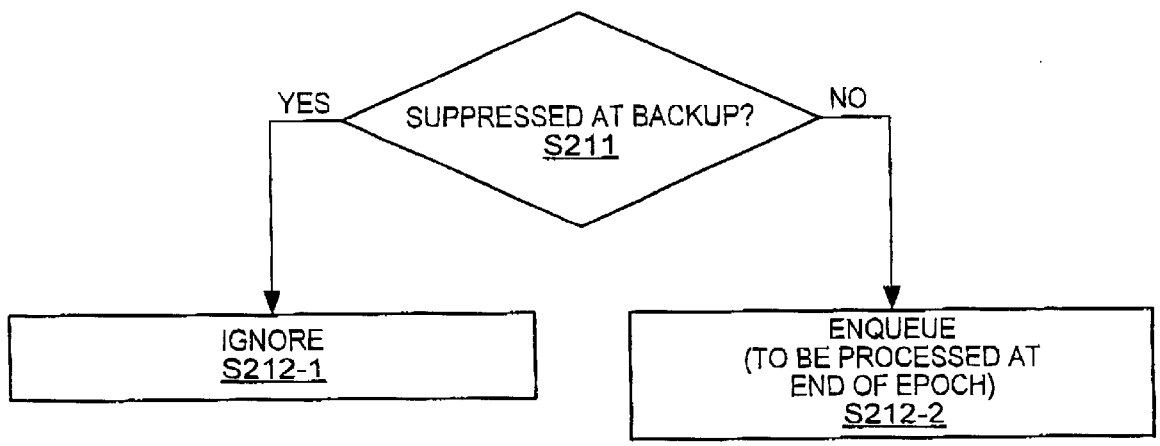

FIG. 21 represents the backup VM processing of strictly global asynchronous external actions. If such an action is suppressed at backup (S211) it is simply ignored (S212-1). Otherwise, it is enqueued to be processed later at the end of epoch (S212-2). When not suppressed, global asynchronous external actions can affect only the local state of a replica.

Figure 22:
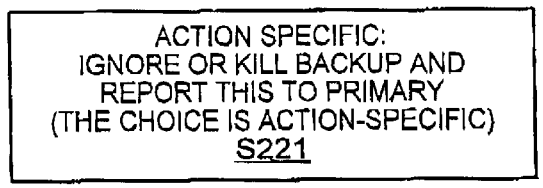

FIG. 22 represents the backup VM processing of weakly global asynchronous external actions. It is action-specific, and it can be either simply ignore, or commit suicide, but first inform the primary about this (S221).

There has been described a virtual machine for a redundant fault tolerant virtual machine architecture including a second virtual machine, wherein the virtual machine comprises means for forming a replica of the second primary virtual machine by replicating operations performed on the primary virtual machine and means for testing for equivalent operation of the secondary virtual machine at predetermined stages of operation. The combination of two virtual machines operating together provides a replicated virtual machine architecture providing software fault tolerance.

The fault tolerant computer system includes a primary virtual machine and a secondary virtual machine, wherein the secondary virtual machine is operable to replicate the primary virtual machine by replicating operations performed on the primary virtual machine, and wherein the primary and the secondary virtual machines are further operable to test for equivalent operation of the primary and secondary virtual machines at predetermined stages of operation.

A virtual machine for the fault tolerant computer system can be provided as a computer program product operable when run on a computer to provide the virtual machine for a redundant fault tolerant virtual machine architecture. The computer program product can be provided on a carrier medium, for example a computer readable medium (e.g., a disc or tape or other computer readable storage or memory medium), or a data transmission medium (e.g., a telephone line, electromagnetic signal or other transmission medium).

It will be appreciated that although particular embodiments of the invention have been described, many modifications/additions and/or substitutions may be made within the spirit and scope of the present invention as defined in the appended claims.

What is claimed is:

1. A fault tolerant computer system comprising a primary virtual machine and a secondary virtual machine, wherein the secondary virtual machine is operable to replicate operations of the primary virtual machine, wherein the primary and the secondary virtual machines are further operable mutually to provide fault tolerance, and wherein a test for liveliness is performed at an epoch boundary, the epoch boundary forming a boundary between sections of code executed by the virtual machines.

2. The fault tolerant computer system of claim 1, wherein the primary and the secondary virtual machines are operable to test for equivalent operation of each other at predetermined stages of operation mutually to provide fault tolerance.

3. The fault tolerant computer system of claim 1, comprising a first processing engine on which the primary virtual machine is operated and a second processing engine on which the secondary virtual machine is operated.

4. The fault tolerant computer system of claim 1, wherein each of the primary and secondary virtual machines is operable to send a heartbeat message to the other of the primary and secondary virtual machines at intervals.

5. The fault tolerant computer system of claim 4, wherein a heartbeat message indicates that virtual machine which sends the heartbeat message is alive, and additionally includes status information.

6. The fault tolerant computer system of claim 4, wherein a test for equivalent operation is performed following receipt of a heartbeat message.

7. The fault tolerant computer system of claim 1, wherein a test for liveliness is performed in response to an input action.

8. The fault tolerant computer system of claim 1, wherein a virtual machine which is found to be in a fault state is terminated.

9. The fault tolerant computer system of claim 1, wherein the primary virtual machine is operable to initiate a new secondary virtual machine where an existing secondary virtual machine is found to be in a fault state.

10. The fault tolerant computer system of claim 1, wherein the secondary virtual machine is operable to be promoted to become a new primary virtual machine when it is found that the old primary virtual machine is faulty.

11. The fault tolerant computer system of claim 1, comprising at least one further secondary virtual machine.

12. The fault tolerant computer system of claim 1, wherein each virtual machine comprises a Java virtual machine.

13. A computer program product operable when run on a computer to provide a virtual machine for a redundant fault tolerant virtual machine architecture including a secondary virtual machine, wherein the secondary virtual machine is operable to form a replica of a primary virtual machine by replicating operations performed on the primary virtual machines, wherein the primary virtual machine is further operable to test for equivalent operation of the secondary virtual machine at predetermined stages of operation, and wherein a test for liveliness is performed at an epoch boundary, the epoch boundary forming a boundary between sections of code executed by the virtual machines.

14. The computer program product of claim 13, wherein each of the primary and secondary virtual machines is operable to issue a heartbeat message at intervals to indicate that it is alive.

15. The computer program product of claim 14, wherein each of the primary and secondary virtual machines is operable to perform a test for equivalent operation following receipt of a heartbeat message.

16. The computer program product of claim 15, wherein the test for liveliness is performed in response to an input action.

17. The computer program product of claim 13, wherein the primary virtual machine is operable to cause the termination of another virtual machine that is found to be in a fault state.

18. The computer program product of claim 13, wherein the primary virtual machine is operable to initiate a new secondary virtual machine where an existing secondary virtual machine is found to be in a fault state.

19. The computer program product of claim 13, wherein the secondary virtual machine can be promoted to become a new primary virtual machine when it is found that an old primary virtual machine is faulty.

20. The computer program product of claim 13, wherein each virtual machine comprises a Java virtual machine.

21. The computer program product of claim 13, comprising a storage medium that stores computer program code implementing the virtual machine.

22. The computer program product of claim 14, comprising a data transmission medium that transmits computer program code implementing the virtual machine.

23. A virtual machine for a redundant fault tolerant virtual machine architecture including another virtual machine, wherein the virtual machine comprises means for forming a replica of the other virtual machine by replicating operations performed on the other virtual machine and means for testing for equivalent operation of the other virtual machine at predetermined stages of operation, and wherein a test for liveliness is performed at an epoch boundary the epoch boundary forming a boundary between sections of code executed by the virtual machines.

24. A method of providing software fault tolerance comprising the provision of replicated virtual machines including at least a primary and a secondary virtual machine, wherein the secondary virtual machine replicates operations performed on the primary virtual machine, and the primary and the secondary virtual machines co-operate so as mutually to provide fault tolerance, the method further comprising performing a test for liveliness at an epoch boundary, the epoch boundary forming a boundary between sections of code executed by the virtual machines.

25. The method of claim 24, wherein the primary and the secondary virtual machines test for equivalent operation of each other at predetermined stages of operation mutually to provide fault tolerance.

26. The method of claim 24, wherein the primary virtual machine operates on a first processing engine and the secondary virtual machine operates on a second processing engine.

27. The method of claim 24, wherein each of the primary and secondary virtual machines sends a heartbeat message to the other of the primary and secondary virtual machines at intervals.

28. The method of claim 24, wherein a heartbeat message indicates that virtual machine which sends the heartbeat message is alive, and additionally includes status information.

29. The method of claim 27, wherein a test for equivalent operation is performed following receipt of a heartbeat message.

30. The method of claim 24, wherein a test for liveliness is performed in response to an input action.

31. The method of claim 24, wherein a virtual machine which is found to be in a fault state is terminated.

32. The method of claim 24, wherein the primary virtual machine initiates a new secondary virtual machine where an existing secondary virtual machine is found to be in a fault state.

33. The method of claim 24, wherein the secondary virtual machine is promoted to become a new primary virtual machine when it is found that an old primary virtual machine is faulty.

34. The method of claim 24, wherein at least one further secondary virtual machine replicates the primary virtual machine.

35. The method of claim 24, wherein each virtual machine comprises a Java virtual machine.

36. A fault tolerant computer system comprising a primary virtual machine and a secondary virtual machine, wherein the secondary virtual machine is operable to replicate operations of the primary virtual machine, wherein the primary and the secondary virtual machines are further operable mutually to provide fault tolerance, wherein each of the primary and secondary virtual machines is operable to send a heartbeat message to the other of the primary and secondary virtual machines at intervals, and wherein a test for equivalent operation is performed following receipt of a heartbeat message.

37. A computer program product operable when run on a computer to provide a virtual machine for a redundant fault tolerant virtual machine architecture including a secondary virtual machine, wherein the secondary virtual machine is operable to form a replica of a primary virtual machine by replicating operations performed on the primary virtual machine, wherein the primary virtual machine is further operable to test for equivalent operation of the secondary virtual machine at predetermined stages of operation, wherein each of the primary and secondary virtual machines is operable to issue a heartbeat message at intervals to indicate that it is alive, and wherein each of the primary and secondary virtual machines is operable to perform a test for equivalent operation following receipt of a heartbeat message.

38. A method of providing software fault tolerance comprising the provision of replicated virtual machines including at least a primary and a secondary virtual machine, wherein the secondary virtual machine replicates operations performed on the primary virtual machine, and the primary and the secondary virtual machines co-operate so as mutually to provide fault tolerance, wherein each of the primary and secondary virtual machines sends a heartbeat message to the other of the primary and secondary virtual machines at intervals, and wherein a test for equivalent operation is performed following receipt of a heartbeat message.

* * * * *